Figure 1:
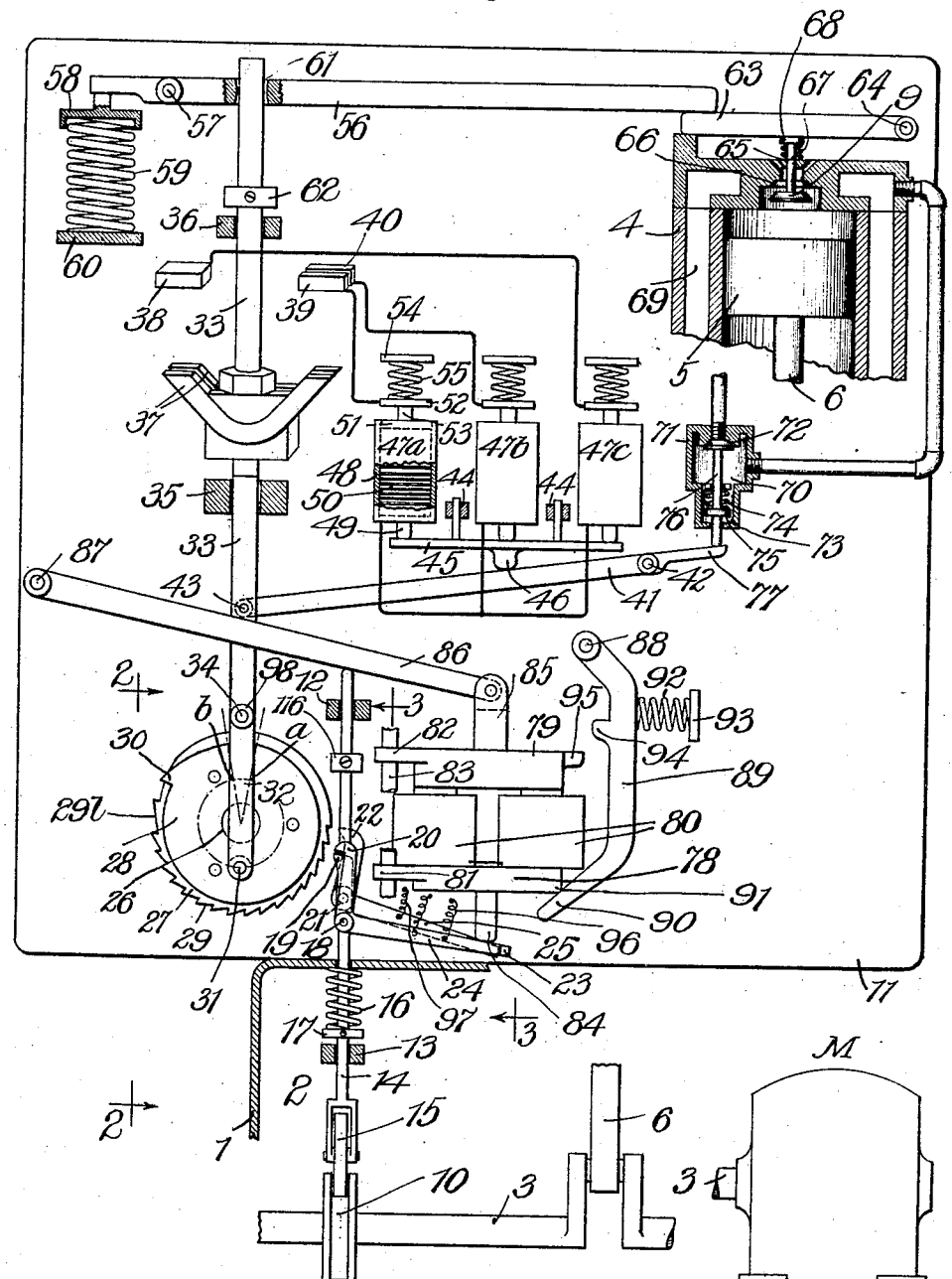

W. J. RICHARDS.
AUTOMATIC CONTROLLING MECHANISM FOR FLUID PRESSURE SYSTEMS.
APPLICATION FILED JULY 15, 1908.

917,897.

Patented Apr. 13, 1909.

4 SHEETS—SHEET 1.

Witnesses:
George E. Higham
Leonard W. Noonider

Inventor
Walter J. Richards
By Brown William
Attorneys

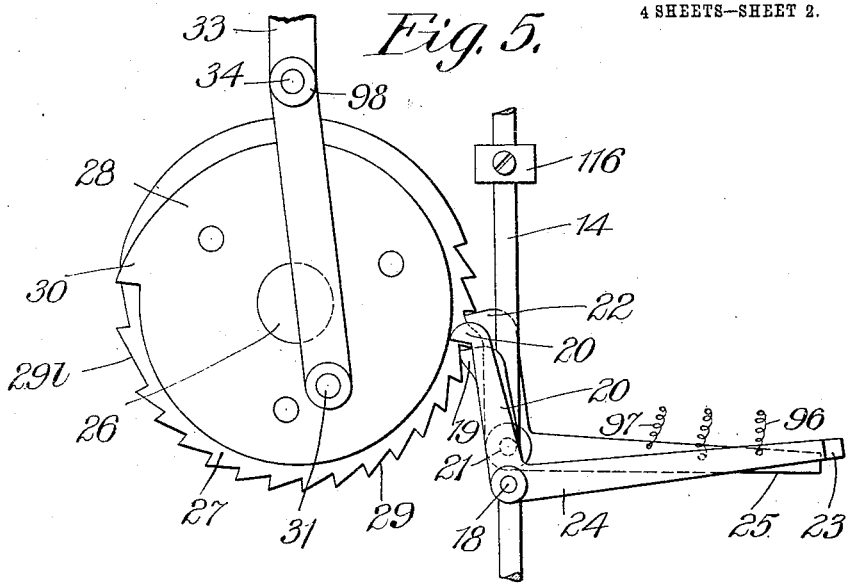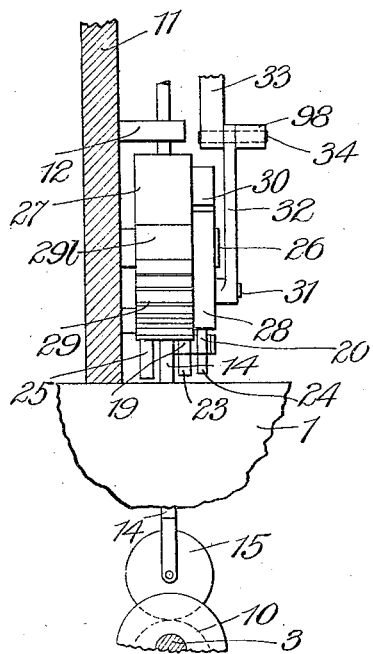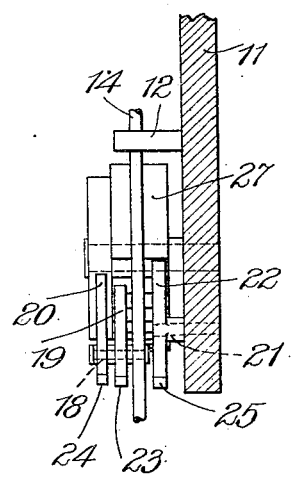

W. J. RICHARDS.
AUTOMATIC CONTROLLING MECHANISM FOR FLUID PRESSURE SYSTEMS.
APPLICATION FILED JULY 15, 1908.

917,897.

Patented Apr. 13, 1909.
4 SHEETS—SHEET 3.

Witnesses:
Leonard W. Novauder
George E. Higham

Inventor
Walter J. Richards
By Brown Williams
Attorneys

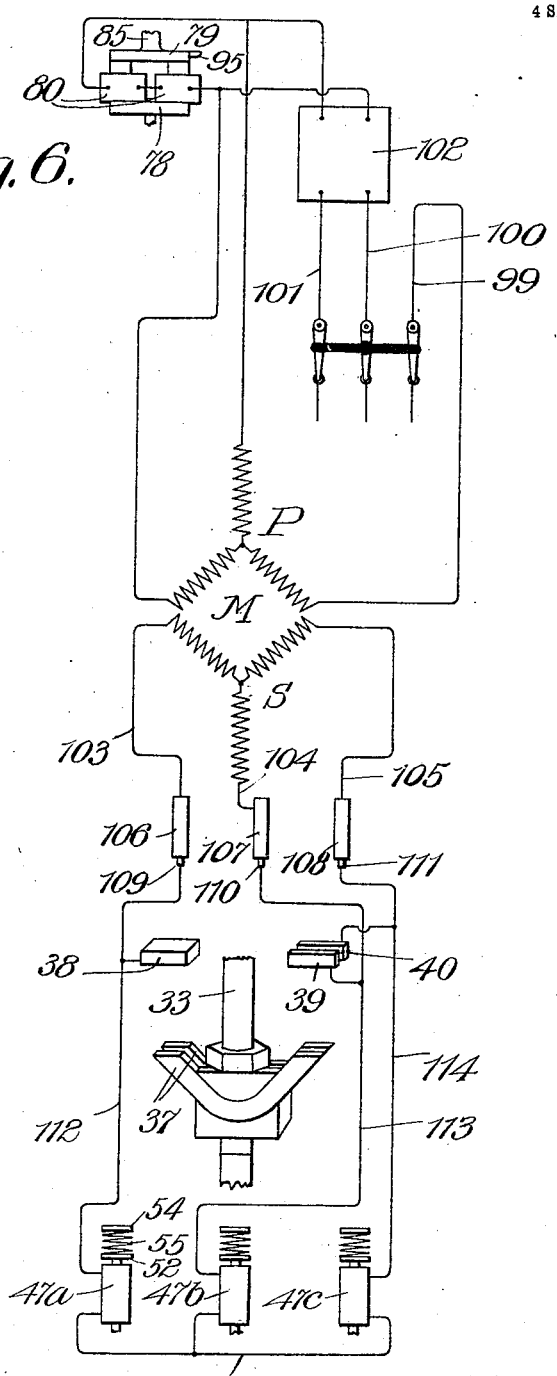

UNITED STATES PATENT OFFICE.

WALTER J. RICHARDS, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

AUTOMATIC CONTROLLING MECHANISM FOR FLUID-PRESSURE SYSTEMS.

No. 917,897.      Specification of Letters Patent.      Patented April 13, 1909.

Application filed July 15, 1908. Serial No. 443,637.

*To all whom it may concern:*

Be it known that I, WALTER J. RICHARDS, a citizen of the United States, residing at Milwaukee, county of Milwaukee, and State of Wisconsin, have invented a certain new and useful Improvement in Automatic Controlling Mechanism for Fluid-Pressure Systems, of which the following is a full, clear, concise, and exact description, reference being had to the accompanying drawings, forming a part of this specification.

My invention relates to automatic controlling mechanism for fluid pressure systems, particularly to automatic controlling mechanism for systems in which air compressors are driven by electric motors.

In my system, all the heavy work is performed by the motor, or mechanically by energy stored by the motor, while the lighter work involved in controlling the motor and the motor operated mechanism is performed partly pneumatically and partly by electromagnetic mechanism. This is a distinct improvement over systems in which the heavier work is performed electrically, as by electromagnets. This is particularly so where alternating current only is available, and where great difficulty would be experienced in obtaining proper and efficient operation of the electromagnets. In my system, step by step mechanism is operated by the motor and is connected with resistance and switching means, the resistance or resistances being normally in the motor circuit when the circuit is primarily closed, and this resistance is gradually lessened by the step-by-step mechanism, and finally removed. The compressor or pump driven by the motor is rendered ineffective until the motor has been properly started, and is then automatically rendered effective by the step-by-step mechanism. The step-by-step mechanism is rendered operative by an electromagnetic structure which operates electrically, to allow the step-by-step mechanism to operate, and it operates mechanically to render this mechanism ineffective or inoperative. The main circuit is primarily controlled by pneumatic switch mechanism, which connects the system circuit with a supply circuit when the pressure in the system reaches a certain minimum value, and which automatically disconnects the system circuit when the pressure reaches a certain maximum value. When this pneumatic switch mechanism is closed, both the motor and the electromagnetic controlling mechanism for the step-by-step mechanism are connected in circuit, and the step-by-step mechanism is immediately actuated by the motor to gradually decrease the resistance, and to finally render the compressor effective. As soon as maximum pressure is reached in the system, the pneumatic switch mechanism opens the circuit, the step-by-step mechanism is rendered inoperative, the motor stops, and the switching mechanism and resistance mechanism return to their normal position, so that when minimum pressure is reached, the motor will again be connected with the circuit with all the resistance in. If for any reason the circuit should be broken, between maximum and minimum pressure values, and circuit through the electromagnetic mechanism will, of course, also be broken, and the step-by-step mechanism rendered inoperative and the resistance and switch mechanism restored to normal. In the electromagnetic mechanism for controlling the step-by-step mechanism, the armature is mechanically brought into contact with the magnet frame, so that there need be no magnetic pull from a distance. This is particularly advantageous where alternating current is used. The resistance mechanism which I employ is in the form of units composed of carbon disks, and the power of the motor is exerted to compress the disks to gradually decrease the resistance, a short-circuiting switch being employed for eventually short-circuiting the units.

My invention will be more clearly understood when described with reference to the accompanying drawings, in which—

Figure 4:
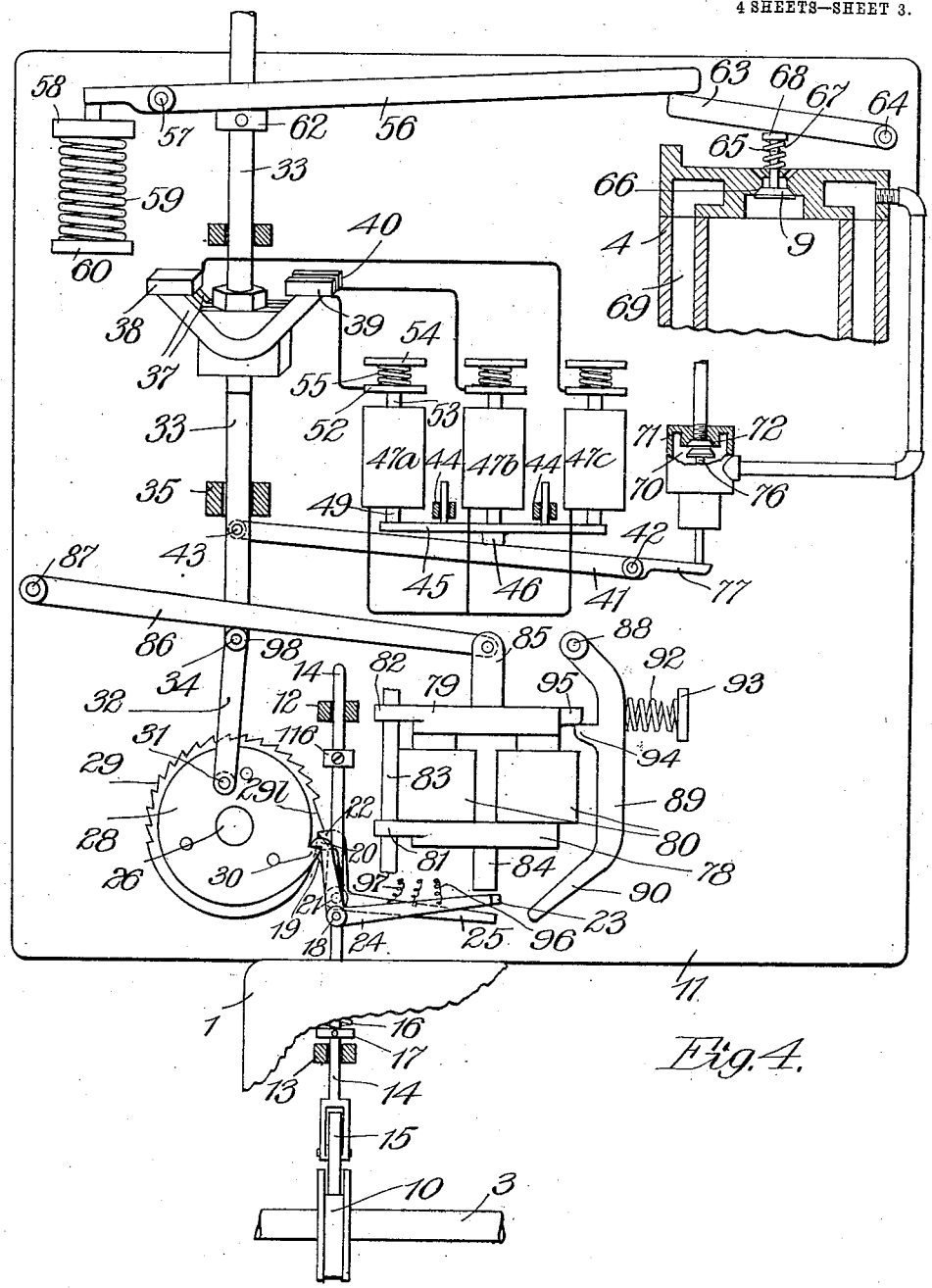

Figure 1 is a more or less diagrammatic lay-out of the various parts and mechanisms comprising my system; Fig. 2 is a view taken from plane 2—2 of Fig. 1, showing more particularly the construction and arrangement of the step-by-step mechanism; Fig. 3 is a view taken from plane 3—3, showing particularly the construction and arrangement of the step-by-step mechanism; Fig. 4 is a view like Fig. 1, showing the short-circuiting switch mechanism in closed position, and the step-by-step and other mechanisms in correspondingly relative positions; Fig. 5 is a view showing the step-by-step mechanism in any intermediate position, and Fig. 6 diagrammatically illustrates the circuit arrangements of the system.

The parts and mechanisms are shown quite diagrammatically, to more plainly illustrate their arrangement and coöperation, it being, of course, understood that in actual practice the parts will be constructed and arranged to obtain the greatest compactness and efficiency. I shall first describe the various mechanisms and then their coöperation.

1 represents the frame of the crank chamber 2. Extending through this frame is a crank shaft 3. Mounted on the frame 1 is a compressor cylinder 4, the top half of which is displaced to the top of the figure for the sake of clearness. Within the cylinder is a piston 5 connected through piston rod 6 with the crank shaft. I have shown a suction valve 9 for controlling the air inlet to the compressor cylinder. The motor M is connected with the crank shaft either directly or through suitable driving means. On the crank shaft, preferably at the end thereof opposite the motor, there is mounted a cam disk 10. A panel 11 for supporting the various operating and controlling mechanisms may be suitably mounted on the frame 1. Extending from the panel is a guide lug 12, and extending from the crank chamber frame is a guide lug 13. In these guide lugs a vertical rod 14 has bearing, to be vertically reciprocable, and at its lower end pivots a cam roller 15 for engaging the cam wheel 10, so that upon rotation of the crank shaft the rod 14 will be vertically reciprocated. A spring 16 mounted on the rod between the collar 17 and the frame part 1 tends to hold the cam roller against the cam wheel. A pivot stud 18 extends forwardly from the rod 14, and on this stud are mounted a pawl 19 and a detent hook 20. Pivoted to a post 21 extending from the panel, at the rear of the rod 14, is a detent pawl 22. Tail pieces 23 and 24 extend laterally from the pawl 19 and detent hook 20, respectively, while a tail 25 extends laterally from the detent pawl 22. To the left of the pawls, as shown in the figures, a bearing stud 26 extends forwardly from the panel, and on said stud are pivoted disks 27 and 28, the disk 27 having ratchet teeth 29 over approximately half of its periphery, and the disk 28 having only one tooth 30. These disks are riveted or otherwise secured together into a unitary structure. The pawl 19 and the detent 22 are adapted to engage with the teeth 29, these teeth being of sufficient width to accommodate both pawl and detent. The hook detent 20 is adapted for engagement with the tooth 30 on disk 28, as will be more fully shown later. When the pawls are in operative position, reciprocation of the rod 14 will cause the pawl 19 and detent 22 to coöperate to rotate the disks step-by-step.

Extending from the disks is a crank pin 31, to which is pivoted the lower end of crank rod 32, whose upper end is pivoted to the crank shaft or rod 33 by means of pivot pin 34, the rod 33 being guided in lugs 35 and 36 extending from the panel. Switch blades 37 are secured to the rod in any suitable manner, and engage with contacts 38, 39 and 40, when the rod 33 is in its upper position, these contacts being suitably supported from the panel. To the right of rod 33 a lever 41 is pivoted at 42 to the panel, and its left end has connection with the rod 33 at 43. Mounted on guideways 44 extending from the panel, is a bar 45, having a lug 46 which engages the lever 41 at an intermediate point. Resting over this bar a plurality of resistance devices 47$^a$, 47$^b$ and 47$^c$ are arranged. Each resistance device comprises a cylindrical casing or bar 48 having a lug 49 extending from its lower end and resting against the bar 45. Within the bar is a tier of carbon disks 50 suitably insulated from the bar, and engaging the top disk is a plunger 51 connected with a plate 52 by a stem 53. Directly above each plate is an extension 54, between which extension and the plate is an extension 54, between which extension and the plate a compression spring 55 is pocketed. As in this system I utilize a three-phase motor for driving the compressor, I have shown three of these resistance outfits, and upon rotation of the lever 41, when the rod 33 rises the bars of the resistance devices will be carried upwardly against the force of the compression springs, and the carbon disks will be pressed together to reduce the resistance of the circuits in which they are included. These circuits will be described more in detail later, the arrangement being such that the switch blade 37, when brought into engagement with its contacts, will short-circuit the resistances.

At the outer end of the panel, a lever 56 is pivoted to the panel at 57. Extending from the left end of this lever is a cap 58 for receiving the upper end of the compression spring 59 which rests on the extension 60 from the panel. Through the lever to the right of its pivot is an opening 61, through which the upper end of the rod 33 projects. A collar 62 on this rod comes into engagement with the lever after the switch blades have engaged contacts 38, 39 and 40, and the lever is swung against the resistance of spring 59. The right end of the lever 56 is shown in engagement with the free end of a lever 63 which is pivoted at its other end to the panel at 64. This lever 63 engages at an intermediate point with the upper end of the stem 65 of the suction valve 9, and when the rod 33 is down, levers 56 and 63 are also down and the suction valve is held from its seat 66, as shown in Fig. 1. However, when the rod 33 rises to swing the lever 56 upwardly, away from the lever 63, the compression spring 67 between cylinder 4 and the head 68 on valve stem 65 becomes effective, and the suction valve is rendered operative. Within the cylinder frame there is also provided a water jacket or chamber 69, to which the flow of water is controlled by a valve 70. The valve frame 71 provides the seat 72 for the valve 70, and also a spring pocket 73, in which is the compression spring 74 bearing against the valve frame, and against a collar 75 within the pocket, and mounted on the valve stem 76, this spring tending to hold the valve away from its seat. The lower end of the valve stem 76 is engaged by the end 77 of the lever 41, extending to the right of pivot 42. When the rod 33 is down, the stem 76 is held up and the valve 70 held against its seat, so that there can be no circulation through the water jacket. When the rod 33 rises, the valve 70 gradually opens and circulation begins. Three operations, therefore, result, when the rod 33 is moved upwardly, the resistance devices being adapted to decrease the resistance and finally short-circuit it, the compressor being rendered effective, and the water jacket circuit opened.

To the right of the step-by-step mechanism is the electromagnetic mechanism for controlling the operativeness of said step-by-step mechanism. This electromagnetic mechanism comprises a hollow, shoe-shaped core 78, an armature 79, and energizing coils 80 on the core. Guide lugs 81 and 82 extending from the core and armature respectively, engage guide rods 83 supported from the panel, so that the electromagnetic structure may be reciprocated vertically. Extending from the core above the tails of the pawls is the lug 84. As shown in Fig. 1, the electromagnet structure is in its lower position in engagement with the tails 23, 24 and 25, so that the pawl and detent mechanism is disconnected from the ratchet members. Pivoted to the extension 85 from the top of the armature 79 is the lever 86, whose left end is pivoted at 87 to the panel. Said lever extends across the rod 33 and is engaged by the upper end of rod 14, so that when the rod 14 is raised by the cam mechanism of the crank shaft, the lever 86 will swing upwardly to carry with it the armature 79 and the core 78, if said core is energized. Pivoted to the panel at 88 is a locking arm 89 extending downwardly, with its end 90 extending diagonally to be normally engaged by the lower edge 91 of the core, so that the arm will be swung to the right against the compression of spring 92 held between said arm and the extension 93 from the panel. A locking tooth 94 extends to the left from the arm, and a locking tooth 95 extends to the right from the armature 79. When the core is energized and the arm 86 swung upwardly, both armature and core of the magnetic structure will be raised; the core will be removed from the end 90 and the arm 89 allowed to swing to the left, to bring the tooth 94 into the path of the tooth 95, the tooth 94 being then brought under the tooth 95 when the armature has been raised high enough, and thus the armature and the core suspended therefrom will be held or locked in its upper position. The extension 84 being removed from the tails 23, 24 and 25, the pawl and detent mechanism is carried by suitable springs 96 and 97 into engagement with the disks 27 and 28, and the step-by-step mechanism is operative, so that rotation of the crank shaft will cause step-by-step rotation of the disks and step-by-step upward movement of the rod 33. The operative position of the step-by-step mechanism is shown in Figs. 4 and 5, Fig. 4 showing the position and relation of the parts after the motor has been brought into full circuit. The lever 86, as before stated, extends across the rod 33 and in the path of an extension from the rod 33, which may be the head 98 of the pin 34, the adjustment being such that this head engages the lever 86 just before the rod comes to its uppermost position, the result being that the weight of the electromagnetic structure is assumed by the lever 86, thus taking the weight from rod 14 and providing a mechanical clearance between lever 86 and the top of rod 14, as will be shown more in detail in the description of the operation of the system.

Fig. 6 illustrates the circuit arrangement for the system. 99, 100, 101 are the three mains of the three-phase circuit supplying current to the three-phase motor. The main 99 passes directly to the primary P of the motor, and the mains 100, 101 pass through an automatic governor 102 of any well known construction, adapted to be controlled by the pressure in the system to open the mains 100 and 101 when maximum pressure in the system is reached, and to close said mains when the pressure falls to a certain minimum. Upon closure of the circuit by the governor, the mains 100 and 101 also connect to the primary P. Bridged across the mains 100 and 101 at a point between the primary and the governor are the energizing coils 80 of the electromagnetic controlling mechanism for the step-by-step mechanism. Closure of the circuit, therefore, causes current flow both through the primary winding of the motor and through these energizing coils. The primary winding P of the motor is inductively associated with the secondary winding S, from which three conductors 103, 104 and 105 extend to the slip rings 106, 107 and 108. Brushes 109, 110 and 111 engage these slip rings and connect through the conductors 112, 113 and 114 respectively with the upper disk of the resistance units 47ª, 47ᵇ and 47ᶜ, respectively, the lower disks of these units being connected together through common conductor 115. Conductor 112 also connects with contact 38, and conductors 113 and 114 connect with contacts 39 and 40, respectively. With this arrangement, when the switch blade 37 is moved upwardly to engage the contacts 38, 39 and 40, the resistance units will be short-circuited and all resistance removed from the secondary winding and the motor will be at full power.

The operation of the system can now be readily understood. Fig. 1 shows what the relative relations of the parts would be if the pressure in the system were normal,— that is, at some point between the maximum and minimum values. If the pressure should reach the minimum value, the automatic governor 102 would immediately be controlled by the pressure to close the circuit to connect the motor primary with the supply mains, and to also connect the energizing windings 80 in circuit. If the armature 79 is not already in contact with the core, as shown, it will come into contact when the motor starts and will then be magnetically locked to the core 78, and as the cam wheel 10 on the crank shaft continues to rotate, the rod 14 is raised, and by virtue of its engagement with the lever 86, it swings this lever upwardly to carry the electromagnetic structure upwardly to release the pawl and detent mechanisms and to cause this electromagnetic mechanism to be locked in its upper position by the tooth 94 of the latch lever 89, as shown in Figs. 4 and 5. At the next upward stroke of said rod, the pawl 19 engaging with the teeth 29 rotates the ratchet disks one step, the detent pawls 22 also engaging with these teeth to hold the ratchet disks in their rotated position when the lever 14 moves downwardly to carry the pawl 19 into engagement with the next tooth. In this manner, the ratchet disks are gradually rotated and the rod 33 carried upwardly, this resulting in the three operations already described, namely, the actuation of the resistance units to decrease the resistance and to be finally short-circuited by the switch contacts, the release of the compressor suction valve to allow the compressor to become effective, and the opening of the circuit for the water jacket about the compressor cylinder. The teeth 29 on disk 27 are of such length that the stroke of the pawl 19 is a trifle less than the length of two teeth, but the last tooth 29¹ is much longer than the teeth 29, but shorter than the stroke of pawl 19. As the disks 27 and 28 must bear considerable loads, their pivot 26 must be of quite large diameter, and therefore there is greater possibility of the connecting rod 32 becoming locked when the crank pin 31 is near its uppermost position. In other words, the dead center arc is increased. If all the teeth were short like the teeth 29, then a condition might result in which the circuit is interrupted when the crank pin 31 is within the dead zone, and the parts instead of returning to their normal position, as they should, will remain locked in their situated position. After the pawl 19 has successively engaged all the teeth 29, the crank pin center will be at the point $a$. If the circuit should be interrupted when the crank pin is in any position between normal and the point $a$, then the released core 78 will strike the tails of the detent pawl and the ratchet disks released, and owing to the action of spring 59, the back pressure of the resistance devices and the weights of the various parts acting on rod 33, the rod 33 will be forced downwardly to rotate the disks in a clockwise direction and to carry the crank pin to its normal position. If the last tooth, 29¹, were only as long as the tooth 29, then the next step after the crank pin reached the point $a$, would carry the crank pin very close to the dead center line, passing axially through the rod 33 and the pivot 26, and the parts would be locked against restoration even though the circuit should be broken. However, by having the last tooth almost twice as long as the teeth 29, a larger angle of rotation will be given the disks when the pawl engages the tooth 29¹, and the crank pin center will be swung across the dead center line to the point $b$. When this position of the crank pin is reached, the tooth 30 on disk 28 will have moved around practically 180 degrees to be received by the hook detent 20. Of course, when the crank pin reaches the point $b$ beyond the dead line, the back pressure on the rod 33 will tend to force the rod downwardly to rotate the disks in a counter-clockwise direction, but this is prevented by the engagement of the tooth 30 with the hook detent. The ratchet teeth engaged by the pawl 19 could all, of course, be longer, so that there would be no danger of the mechanism being stopped at the dead center, but the teeth 29 are made short for the purpose of giving sufficient length of time for the motor to assume its proper electrical conditions. The pawl, 19, after engagement with the one tooth 29, is carried downwardly over the next tooth and almost over the length of the following tooth. The increment of rotation of the disks and the lost motion can therefore be made sufficient to give ample time for the proper circuit conditions to be established for the motor, before the motor finally receives the load of the compressor.

If the circuit conditions remain normal,— that is, if the circuit is not accidentally interrupted, the step-by-step mechanism will remain operative until the crank pin 31 reaches the point $b$, at which point the hook detent 20 receives the tooth 30. As has already previously been shown and mentioned, the head 98 of the pivot pin 34 comes into engagement with the lever 86 shortly before the crank pin 31 reaches its upper position, and the load of the electromagnetic mechanism comprising the armature 79 and core 78 is assumed by the rod 33 and removed from the rod 14. Also after the crank pin 31 reaches the point b, and the tooth 30 is engaged by hook detent 20, the ratchet disks will be rotated counter-clockwisely a short distance, and rod 14 carried upwardly a distance, until the collar 116 on said rod engages against the lug 12. This distance of movement of the rod is such that the cam roller 15 will be carried from the path of the cam wheel 10, the condition then being that all the parts are mechanically held and locked in their actuated position by the counter force on rod 33, caused by the spring 59 and the back pressure of the resistance units and also the weight of the various parts. This position of the parts is maintained until the pressure in the system has been brought to maximum by the compressor, or until the circuit is accidentally opened. In both cases, the electromagnetic mechanism becomes deënergized, and the core 78 drops away from armature 79 and the extension 84 from the core by striking the tails of the pawl mechanisms, causes the pawl mechanisms to be withdrawn from the ratchet wheels. The hook detent 20 being withdrawn from the tooth 30, the ratchet disks will be rotated counter-clockwisely by the pressure of rod 33 until the crank pin 31 reaches its normal lower position, as shown in Fig. 1. The head 98 being withdrawn from lever 86, and the latch arm 89 having been swung to the right by the falling core, the armature 79 is released and falls until the arm 86 comes to rest against the rod 14. The lever 41 also rotates back to normal position to allow the resistance disks to assume their normal positions and to re-close the valve 70 to shut off the water jacket circulation, while the lever 56 being released from collar 62 will be swung back to normal by force of the spring 59, whereupon lever 63 is brought against the suction valve stem and said valve brought back to its open position. The rod 14 is also released, and the cam roller 15 brought into engagement with the cam wheel 10. If the break in the circuit is restored, or the pressure has become reduced to the minimum point, the controlling electromagnetic mechanism is again energized and the motor started to operate the step-by-step mechanism to again bring the compressor into operation to restore the pressure, and when maximum pressure is again reached, the parts are tripped and moved to their normal position. Even though the last tooth is sufficiently long so that when the current is not interrupted, the crank pin will be carried sufficiently beyond the dead line to insure operation, the condition might arise where the circuit would be opened just as the crank pin were passing through the dead line. There is, however, enough momentum in the compressor and connected parts to carry at least one revolution, so that such a condition could not occur.

It will be seen, from the above description of my improved system, that every starting-up operation depends for its power upon the motor and not upon electromagnets, and this is extremely desirable in alternating current work, where special expensive magnets would be necessary to exert any pull through a considerable distance. In the magnetic structure which I employ to control the operation of the step-by-step mechanism, the armature normally engages directly with the core and consequently when the core is energized the armature does not have to be attracted from a distance, and will be securely and efficiently held in place on the core. A single phase magnet can, therefore, be employed, and will operate equally efficiently on a two or three or multi-phase circuit, or on a direct current circuit. This electromagnet is also the only one in the entire system, thus greatly reducing the cost of manufacture. A direct current motor could also be employed and would be equally well controlled. The resistance mechanism, in the form of carbon disks, which I use, is very efficient in a system of this kind, as sufficient power is available to give the necessary pressure on the disks to obtain the desired resistance conditions. The power of the motor acting through the step-by-step mechanism is multiplied, and any desired pressure can be brought on the resistance disks. As has been shown, this pressure stored in the disks and the energy stored in the spring 59 forms the power for assuming the burden of locking the parts in actuated position after the crank pin reaches the point b, and also furnishes the power to quickly and effectively restore the parts to their normal position upon opening of the circuit. The electromagnetic structure, comprising the armature 95 and core 78, electrically and mechanically controls the step-by-step mechanism operated by the motor. Closure of the circuit causes energization of the electromagnetic mechanism, so that it may be bodily carried upwardly to allow the step-by-step mechanism to become effective. This control is electrical. When, however, the circuit is opened, the core 78 is released and falls to mechanically render the step-by-step mechanism ineffective by withdrawing the pawl and detent mechanism from the ratchet wheels. As has already been shown, there is no chance for the parts to assume a neutral or dead position. The mechanism employed is also very simple, and the entire controlling system can be manufactured very inexpensively.

As before stated, the drawings have been made quite diagrammatic to clearly show the coöperation of the parts, but the construction and arrangement in an actual system would, of course, depend upon circumstances, and would be such as to be the most efficient and compact. I do not, therefore, wish to be limited to the precise arrangement shown.

I claim as new and desire to secure by Letters Patent:

1. In a system of the class described, the combination of a motor, means to be driven by the motor, a circuit for the motor, step by step mechanism connected with the motor to be driven thereby and also adapted upon operation to change the resistance conditions of the motor circuit, means normally rendering the step by step mechanism inoperative, and means operated by the motor for rendering said step by step mechanism operative.

2. In a system of the class described, the combination of a motor, a circuit for the motor, resistance mechanism for the motor circuit, connecting mechanism connected with the resistance mechanism and having connection with the motor to be operated thereby to affect the resistance mechanism to change the motor circuit conditions, means normally rendering the actuating mechanism inoperative, and means controlled by the motor for rendering said actuating mechanism operative.

3. In a system of the class described, the combination of a driving motor, a circuit for the motor, circuit controlling mechanism, step by step actuating mechanism for the circuit controlling mechanism, said step by step mechanism being connected with the motor to be driven thereby, means normally associated with the step by step mechanism to render said mechanism inoperative, and means controlled by the motor for dissociating the said first means from the step by step mechanism whereby said step by step mechanism becomes operative.

4. In a system of the class described, the combination of a driving motor, a circuit for the motor, circuit controlling mechanism for the motor circuit, actuating mechanism for the circuit controlling mechanism connected with the motor to be operated thereby, means normally associated with the actuating mechanism to prevent operation thereof by the motor, and means controlled by the motor whereby said first means is dissociated from the actuating mechanism whereby said actuating mechanism may be operated by the motor to affect the circuit mechanism.

5. In a system of the class described, the combination of a driving motor, a circuit for the motor, circuit controlling mechanism for the circuit, pawl and ratchet actuating mechanism for the circuit controlling mechanism, said pawl and ratchet mechanism having connection with the motor to be driven thereby to affect the circuit controlling mechanism, means normally causing dissociation of the members of the pawl and ratchet mechanism to prevent operation thereof by the motor, and means controlled by the motor for dissociating said first means from the members of the pawl and ratchet mechanism to allow operation of said mechanism by the motor.

6. In a system of the class described, the combination of a driving motor, a circuit for the motor, circuit controlling mechanism for the motor circuit, ratchet mechanism connected with the circuit controlling mechanism, pawl mechanism connected with the motor to be driven thereby, means normally preventing coöperation of the ratchet mechanism and pawl mechanism, and means controlled by the motor for causing coöperation of the ratchet and pawl mechanisms whereby said ratchet mechanism is driven and the circuit controlling mechanism affected.

7. In a system of the class described, the combination of a driving motor, a circuit for the motor, controlling mechanism for the motor circuit, ratchet mechanism connected with the circuit controlling mechanism, pawl mechanism connected with the motor to be driven thereby, means normally withholding the pawl mechanism from the ratchet mechanism, and means whereby said first means is affected upon movement of the motor to allow the said pawl mechanism to become associated with the ratchet mechanism whereby said ratchet mechanism is driven by the pawl mechanism to affect the circuit controlling mechanism.

8. In a system of the class described, the combination of a driving motor, a circuit for the motor, controlling mechanism for the circuit, pawl and ratchet mechanism connected with the circuit controlling mechanism and with the motor to be driven by said motor to cause actuation of the circuit controlling mechanism, detent means normally associated with the pawl and ratchet mechanism to prevent coöperation of the parts of said mechanism, and means controlled by the movement of said motor for disconnecting said detent mechanism to allow dissociation of the pawl and ratchet mechanism parts whereby said mechanism may be driven by the motor.

9. In a system of the class described, the combination of a driving motor, a circuit for the motor, circuit controlling mechanism for the motor circuit, ratchet mechanism adapted upon rotation to actuate the circuit controlling mechanism, pawl mechanism connected with the motor to be driven thereby, detent mechanism normally engaging said pawl mechanism to prevent coöperation thereof with the ratchet mechanism, and means controlled by the primary movement of said motor for releasing said detent mechanism from the pawl mechanism whereby said pawl mechanism may become associated with the ratchet mechanism and whereby further movement of the motor will cause operation of the connected ratchet and pawl mechanisms to cause actuation of the circuit controlling mechanism.

10. In a system of the class described, the combination of a driving motor, a circuit for the motor, circuit controlling mechanism for the circuit, actuating mechanism for the circuit controlling mechanism having connection with the motor to be driven thereby, means normally associated with the actuating mechanism to render said actuating mechanism inoperative, and means jointly controlled by the current flow through the circuit and by said motor for affecting said first means, whereby said actuating mechanism may become operative to be driven by the motor to actuate the circuit controlling mechanism.

11. In a system of the class described, the combination of a driving motor, a circuit with which the motor is to be connected, circuit controlling mechanism for controlling the connection of said motor with said circuit, actuating mechanism for the circuit controlling mechanism, a detent member for normally rendering the actuating mechanism inoperative, and means controlled electrically by the current flow through the circuit and mechanically by said motor for removing said detent means from the actuating means to render said actuating means operative whereby said actuating means may be driven by the motor to actuate the circuit controlling mechanism and to connect the motor with the circuit.

12. In a system of the class described, the combination of a driving motor, a circuit, controlling means for controlling the connection of said motor with the circuit, actuating mechanism for the circuit controlling mechanism having connection with the motor to be driven thereby, means for causing said actuating mechanism to be in inoperative condition when the motor is idle, and means controlled by the movement of said motor for rendering said actuating mechanism operative.

13. In a system of the class described, the combination of a driving motor, a circuit, circuit controlling mechanism for controlling the connection of the motor with the circuit, ratchet mechanism connected with the circuit controlling mechanism, pawl mechanism connected with the motor to be driven thereby, a detent frame normally withholding the pawl mechanism from the ratchet mechanism, actuating mechanism normally disconnected from its detent member, electrical means controlled by the current flow through the circuit for connecting said actuating mechanism with the detent member, and means whereby primary movement of the motor will cause movement of the actuating mechanism to carry the detent member connected therewith away from the pawl mechanism to allow said pawl mechanism to become associated with the ratchet mechanism whereby further movement of the motor will cause actuation of the ratchet mechanism by the pawl mechanism and actuation of the circuit controlling mechanism to connect the motor with the circuit.

14. In a system of the class described, the combination of a driving motor, a circuit for the motor, circuit controlling mechanism for the motor circuit, actuating mechanism for the circuit controlling mechanism adapted for connection with the motor to be driven thereby, electro magnetic mechanism normally associated with the actuating mechanism to hold said mechanism in inoperative position, and means controlled by said motor to cause the bodily movement of the electro magnetic mechanism whereby said actuating mechanism is restored to operative position and whereby further movement of the motor will result in operation of the actuating mechanism and actuation of the circuit controlling mechanism.

15. In a system of the class described, the combination of a driving motor, a circuit for the motor, resistance mechanism for controlling the motor circuit, a ratchet wheel, a connecting rod connected with said ratchet wheel and with the resistance mechanism, pawl mechanism having connection with the motor to be reciprocated, means normally withholding the pawl mechanism whereby the connecting rod may assume a normal position and means controlled upon primary movement of the motor to allow connection of the pawl mechanism with the ratchet mechanism whereby further movement of the motor will cause the pawl mechanism to rotate the ratchet wheel to thereby cause movement of the connecting rod and operation of the resistance mechanism to gradually connect said motor to the circuit.

16. In a system of the class described, the combination of a driving motor, a circuit with which the motor is to be connected, resistance mechanism, a ratchet wheel having a crank pin, a connecting rod pivoted to said crank pin and having connection with the resistance mechanism, said connecting rod and crank pin being normally in the lowermost position, pawl mechanism having connection with the motor to be reciprocated, said pawl mechanism being adapted for connection with the ratchet wheel whereby operation of the motor will cause rotation of the ratchet wheel and movement of the connecting rod to affect the resistance mechanism to gradually change the resistance of the motor circuit, and means for preventing return of the ratchet wheel after the crank pin and connecting rod pass through the dead center.

17. In a system of the class described, the combination of a driving motor, a circuit for the motor, resistance for the motor circuit, a rod having connection with said resistance, a ratchet wheel, a crank pin on said ratchet wheel, a connecting link connecting said crank pin with said rod, pawl mechanism for engaging said ratchet wheel, said pawl mechanism having connection with the motor to be reciprocated thereby, a plurality of short teeth for the ratchet wheel, and a longer tooth for the ratchet wheel, said longer tooth being in position to be engaged by the pawl mechanism to cause the ratchet wheel to be rotated by the pawl mechanism when the crank pin passes through the dead center.

18. In a system of the class described, the combination of a driving motor, a circuit for the motor, resistance devices, a reciprocal rod having connection with the resistance devices, a ratchet wheel, a link pivoted to the rod and to the ratchet wheel whereby rotation of the ratchet wheel will cause longitudinal movement of the rod, pawl mechanism adapted for connection with the ratchet wheel, and having connection with the motor to be reciprocated thereby, means tending to hold said rod in normal position in which the resistance devices are in condition to introduce resistance in the motor circuit, rotation of the ratchet wheel by the pawl mechanism causing movement of the rod and actuation of the resistance devices to remove resistance from the motor circuit, and means controlled by the current flow through the circuit for disconnecting the pawl mechanism from the ratchet wheel whereby said ratchet wheel and rod may return to normal position and whereby the resistance devices are affected to include resistance in the motor circuit.

19. In a system of the class described, the combination of a driving motor, a circuit for the motor, resistance adjusting devices, a rotatable ratchet frame, a crank rod pivoted to said ratchet frame to be reciprocated upon rotation of the ratchet frame, said crank rod having connection with the resistance adjusting devices, pawl mechanism adapted for connection with the ratchet frame and having connection with the motor to be reciprocated thereby, means tending to resist the rotation of the ratchet frame by said pawl mechanism, actuation of the ratchet frame by the pawl mechanism causing movement of the connecting rod and movement of the resistance devices to change the resistance conditions of the motor circuit, and means controlled by the current flow through the circuit for withdrawing said pawl mechanism from the ratchet frame whereby said resisting medium becomes effective to restore the ratchet frame to normal position and thereby to restore the resistance devices to normal condition.

20. In a system of the class described, the combination of a motor, a circuit for the motor, resistance adjusting devices for the motor circuit, a pivoted ratchet frame, a crank pin upon said frame, a connecting rod pivoted to said crank pin and having connection with the resistance adjusting devices, rotation of the ratchet frame causing movement of the connecting rod to affect the resistance adjusting devices to change the resistance conditions of the motor circuit, pawl mechanism connected with the motor to be reciprocated thereby, teeth for the ratchet frame adapted for association with the pawl mechanism whereby said ratchet frame will be rotated upon reciprocation of the pawl mechanism by the motor, means for resisting the rotation of the ratchet frame by the pawl mechanism, detent pawl mechanism, and an additional tooth on said ratchet frame engaged by said detent pawl mechanism to lock said ratchet frame against rotation after the crank pin has been rotated through the dead center.

21. In a fluid pressure system, the combination of a driving motor, a compressor to be driven by the motor, means for normally rendering said compressor ineffective, a circuit for the motor, resistance in the motor circuit, step-by-step mechanism driven by the motor, and an actuating member driven by said step-by-step mechanism to decrease the resistance in the motor circuit and to affect said means to cause the compressor to be rendered effective.

22. In a fluid pressure system, the combination of an electric driving motor, a circuit for the motor, resistance for the motor circuit, a compressor to be driven by the motor, means normally rendering the compressor ineffective, a water jacket for the compressor, a valve controlling the flow of water through the water jacket, said valve being normally closed, an actuating member, step-by-step mechanism driven by the motor to cause a change in the condition of the resistance in the motor circuit and to cause opening of said valve, and then to actuate said means to cause the compressor to become effective.

23. In a fluid pressure system, the combination of a motor, a compressor connected with the motor to be driven thereby, controlling valve mechanism for the compressor, means normally affecting said valve mechanism to cause the compressor to be ineffective, a water jacket for the compressor, a normally closed valve for controlling the water flow to said water jacket, a circuit for the motor, resistance for said circuit, an actuating member, a ratchet wheel, a connecting rod connecting said ratchet wheel with the actuating member, said connecting rod being normally in one dead center position with reference to the ratchet wheel, pawl mechanism driven by the motor and coöperating with the ratchet wheel to cause step-by-step rotation thereof, and step-by-step movement of the connecting rod and actuating member, means connecting said actuating member with the resistance for causing change in said resistance upon movement of the actuating member, means connected with said water jacket valve for causing opening of said valve upon movement of the actuating member, said actuating member upon movement causing actuation of the means associated with the compressor valve mechanism to cause said valve mechanism to be rendered effective, and means controlled by the current flow from the motor for disconnecting the pawl mechanism from the ratchet wheel to allow said actuating member to return to normal position, whereby said resistance and water valve are restored to normal position and the compressor valve is again rendered ineffective.

24. In a fluid pressure system, the combination of a motor, a circuit for the motor, resistance units for the motor in the form of carbon disks, a ratchet wheel, an actuating rod, a crank pin, a connecting rod connecting said actuating rod with the crank pin, said crank pin being normally in one dead center with reference to the ratchet wheel, pawl mechanism driven by the motor, means normally withholding said pawl mechanism from the ratchet wheel, said means being controlled upon first movement of the motor to release the pawl mechanism, further movement of the motor causing said pawl mechanism to rotate the ratchet wheel step by step to cause step-by-step movement of the actuating member, means for causing compression of the resistance units upon movement of the actuating member whereby the resistance of the motor circuit is decreased, and means controlled by the current flow through the motor circuit to cause said means associated with the pawl mechanism to again disconnect the pawls from the ratchet wheel whereby said wheel and the actuating rod may return to normal position, thereby relieving the pressure on the resistance units to again increase the resistance in the motor circuit.

25. In combination, an electric motor, a circuit for said motor, resistance for the motor circuit, a ratchet wheel, pawl mechanism connected with the motor to be driven thereby, a crank pin for the ratchet wheel, an actuating rod connected with the crank pin and with the resistance, said crank pin being normally held in one dead center position, said pawl mechanism being normally disconnected from the ratchet wheel, means controlled upon movement of the motor for connecting said pawl mechanism with the ratchet wheel, whereby said motor will drive the pawl mechanism to cause rotation of the ratchet wheel and step-by-step movement of the crank pin toward its other dead center, actuation of said actuating rod causing said resistance to be adapted to change the conditions of the motor circuit, a detent wheel pivoted concentrically with the ratchet wheel and secured thereto, a detent pawl, means whereby said detent pawl engages with the detent wheel when the crank pin passes through the other dead center, whereby said ratchet wheel will be locked and said actuating member prevented from returning to normal position, and means controlled by the current flow through the motor circuit for causing said pawl mechanism and detent pawl to be disconnected from the ratchet wheel and detent wheel, whereby said wheels and said actuating rod may return to normal position, thereby causing said resistance to be restored to normal condition.

26. In a system of the class described, the combination of a motor, resistance mechanism for the motor circuit, transmission mechanism connected with the resistance mechanism adapted to be driven by the motor, an electromagnetic structure adapted to be mechanically associated with the transmission mechanism to render said mechanism inoperative, said electromagnetic structure being electrically controlled by the motor circuit and mechanically controlled by the motor to become dissociated from the transmission mechanism upon starting of the motor, whereby said transmission mechanism becomes operative, and said resistance mechanism actuated to change the conditions of the motor circuit.

27. In a system of the class described, the combination of a motor, transmission mechanism to be driven by the motor, an electromagnet structure comprising a core and an armature, one of said electromagnet parts being adapted for association with the transmission mechanism to render said mechanism inoperative, an energizing winding for the electromagnet structure controlled by the motor circuit and adapted upon closure of the motor circuit to energize the electromagnet structure to cause the parts thereof to be magnetically held together, and means adapted upon starting of the motor to bodily move the electromagnet structure out of association with the transmission mechanism, to allow said transmission mechanism to be operated by the motor, opening of the circuit for the energizing winding causing separation of the electromagnet parts and re-association of the one part thereof with the transmission mechanism to again render said transmission mechanism inoperative.

28. In a system of the class described, the combination of a motor, transmission mechanism to be driven by the motor, an electromagnet frame part adapted to be associated with the transmission mechanism to render said mechanism inoperative, a second electromagnet frame part connected with the transmission mechanism, an energizing winding for the electromagnet frame, a main circuit, a circuit for the motor connected with the main circuit, a circuit for the energizing winding connected with the main circuit, closure of the main circuit causing closure of the motor circuit and closure of the energizing winding circuit, whereby the two electromagnet frame parts are magnetically connected together, the initial movement of the motor causing bodily movement of the electromagnet frame out of association with the transmission mechanism, whereby said mechanism becomes operative to be actuated upon further movement of the motor, opening of the main circuit causing opening of the energizing winding circuit whereby the one electromagnet frame part is released from the other part and associated with the transmission mechanism to again render said mechanism inoperative.

29. In a system of the class described, the combination of a motor, means to be operated by the motor, pawl and ratchet mechanism for transmitting power from the motor to the mechanism to be actuated, a magnetic frame adapted for association with the pawl mechanism to dissociate said pawl mechanism from the ratchet mechanism to thereby render the pawl and ratchet mechanism inoperative, an armature for the electromagnet frame, an energizing winding for the electromagnet frame, a main circuit for supplying the motor and said electromagnet winding, closure of the motor and energizing winding circuit causing operation of the motor and energization of the electromagnet frame to attract the armature, means adapted upon initial movement of the motor to move the armature and thereby the electromagnet frame away from the pawl mechanism to allow the pawl and ratchet mechanism to become operative whereby further movement of the motor may operate the pawl and ratchet mechanism to cause operation of the mechanism to be actuated.

30. In a system of the class described, the combination of a motor, an actuating rod, circuit controlling mechanism connected with said rod, a ratchet wheel to which said rod is pivoted to be moved upon rotation of the ratchet wheel, pawl mechanism, connecting means between the pawl mechanism and motor whereby said pawl mechanism is reciprocated upon rotation of the motor, an electromagnet frame adapted to engage the pawl mechanism to hold said pawl mechanism from the ratchet mechanism, an armature for said electromagnet frame and an energizing winding therefor, a main circuit, means for connecting said motor and said energizing winding with the main circuit, energization of the electromagnet frame causing attraction of its armature, means controlled by the initial movement of the motor for moving the armature and thereby the electromagnet frame away from the pawl mechanism to allow said pawl mechanism to engage with the ratchet mechanism whereby further movement of the motor will cause the pawl mechanism to rotate the ratchet mechanism, thereby causing movement of the actuating rod and actuation of the resistance mechanism to control the resistance conditions of the motor circuit, and means for locking the armature in the position to which it is moved by the motor power opening of the energizing circuit causing release of the electromagnet frame from the armature and re-association thereof with the pawl mechanism to again disconnect said pawl mechanism from the ratchet wheel.

31. In a system of the class described, the combination of a motor, a compressor to be driven by the motor, a controlling valve for the compressor, means for normally incapacitating said valve to render the compressor ineffective, a ratchet wheel, an actuating rod connecting the said ratchet wheel to be moved upon rotation of said ratchet wheel, pawl mechanism for coöperating with said ratchet wheel, connecting means between said pawl mechanism and motor for causing reciprocation of the pawl mechanism upon rotation of the motor, an electromagnet frame part adapted to engage the pawl mechanism to disconnect said pawl mechanism from the ratchet wheel, a second electromagnet frame part, an energizing winding for the electromagnet frame, means for connecting said motor and said energizing winding with a circuit whereby the motor will rotate and the electromagnet frame will be energized to magnetically connect its two parts together, means controlled upon initial movement of the motor for bodily moving the connected together electromagnet parts to thereby release the first part from the pawl mechanism to allow said pawl mechanism to engage the ratchet wheel, whereby the ratchet wheel will be rotated by the pawl mechanism upon further rotation of the motor, means operative after an interval of movement of the ratchet wheel, an actuating rod connected therewith to disconnect the pawl mechanism from the motor, and means actuated by the actuating rod after an interval of movement thereof to render the compressor valve operative, whereby the compressor will be effectively driven by the motor.

32. In a system of the class described, the combination of a motor, pawl mechanism, means connecting said pawl mechanism with the motor to cause reciprocation of the pawl mechanism upon rotation of the motor, a ratchet wheel to be rotated step by step by the pawl mechanism, mechanism to be actuated connected with said ratchet wheel, means adapted after an interval of rotation of the ratchet wheel to engage the pawl mechanism and to remove said pawl mechanism from driving engagement with the motor, and means controlled by the current flow through the motor circuit for actuating the pawl mechanism to release the ratchet mechanism to allow said ratchet mechanism and the mechanism connected therewith to return to normal position.

33. In a system of the class described, the combination of a motor, a rod adapted to be longitudinally reciprocated upon rotation of the motor, pawl mechanism pivoted to said rod, a ratchet wheel adapted to be engaged by the pawl mechanism to be rotated, mechanism to be actuated connected with the ratchet wheel, an electromagnet frame part adapted to engage the pawl mechanism to disconnect said pawl mechanism from the ratchet wheel, a second electromagnet frame part connected with the pawl mechanism supporting rod to be moved upon rotation of the motor, an energizing winding for the electromagnet frame controlled by current flow through the motor, current flow through the winding causing the electromagnet frame parts to be magnetically connected and held together, initial movement of the motor causing the pawl mechanism supporting rod to bodily move the connected together electromagnet frame parts, whereby the pawl mechanism is released and allowed to engage with the ratchet wheel, whereby further movement of the motor will cause rotation of the ratchet wheel and of the mechanism controlled thereby, opening of the circuit through the motor and through the energizing winding causing release of the first electromagnet frame part from the second part and return of said first part to a position to disconnect the pawl mechanism from the ratchet wheel, whereby said ratchet wheel and the mechanism controlled thereby may return to normal position.

34. In combination, a ratchet wheel, mechanism to be actuated upon rotation of said ratchet wheel, pawl mechanism, a rod to which said pawl mechanism is pivoted, a motor having connection with said rod to cause reciprocation thereof, an electromagnet frame part normally engaging the pawl mechanism to disconnect said pawl mechanism from the ratchet wheel, a second electromagnet frame part, a pivoted arm supporting said second electromagnet frame part and disposed in the path of the reciprocating rod, an energizing winding for the electromagnet frame part, current flow through said winding causing the electromagnet frame parts to be brought and held together, whereby initial movement of the motor will engage the supporting arm to cause bodily movement of the electromagnet frame parts and disconnection of the first frame part from the pawl mechanism to allow said pawl mechanism to engage the ratchet wheel so that said ratchet wheel may be rotated by said pawl mechanism upon further rotation of the motor, a latch for engaging the second electromagnet frame part to hold the said electromagnet frame parts in the position in which they have been carried upon initial movement of the motor, opening of the circuit through the energizing winding causing release of the first electromagnet frame part, whereby said frame part again engages the pawl mechanism to disconnect said pawl mechanism from the ratchet wheel, whereby said ratchet wheel and the mechanism controlled thereby may return to normal position, said latch member being engaged by the first electromagnet frame part upon movement thereof to its normal position, whereby said second electromagnet frame part will be released from the latch.

In witness whereof, I hereunto subscribe my name this 30th day of June, A. D. 1908.

WALTER J. RICHARDS.

Witnesses:
WALTER J. HOGAN,
R. A. WEGNER.